April 21, 1953 C. F. HUNT 2,635,284
POULTRY DEFEATHERING APPARATUS
Filed Sept. 19, 1950 3 Sheets-Sheet 1
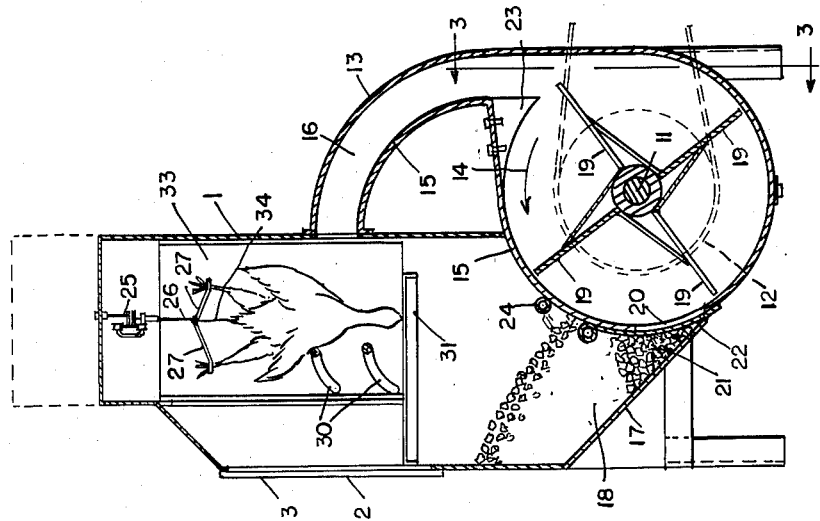
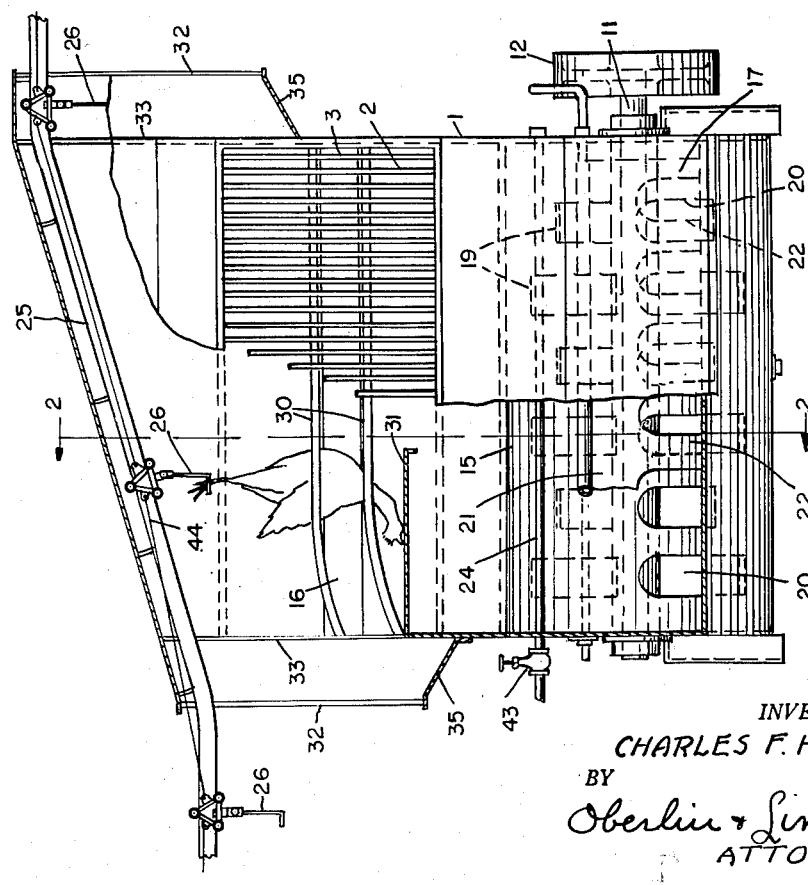
INVENTOR.
CHARLES F. HUNT
BY
Oberlin & Limbach
ATTORNEYS.

April 21, 1953 C. F. HUNT 2,635,284
POULTRY DEFEATHERING APPARATUS
Filed Sept. 19, 1950 3 Sheets-Sheet 2

INVENTOR.
CHARLES F. HUNT
BY
Oberlin + Limbach
ATTORNEYS.

April 21, 1953  C. F. HUNT  2,635,284
POULTRY DEFEATHERING APPARATUS
Filed Sept. 19, 1950  3 Sheets-Sheet 3

INVENTOR.
CHARLES F. HUNT
BY
Oberlin & Limbach
ATTORNEYS.

Patented Apr. 21, 1953

2,635,284

UNITED STATES PATENT OFFICE 2,635,284

POULTRY DEFEATHERING APPARATUS

Charles F. Hunt, Akron, Ohio

Application September 19, 1950, Serial No. 185,555

9 Claims. (Cl. 17—11.1)

The present invention relates generally as indicated to a poultry defeathering apparatus and has for one of its primary objects the provision of an apparatus by which thorough defeathering can be accomplished in a very economical and efficacious manner. This application is a continuation-in-part application of my co-pending application Serial No. 25,358 filed May 6, 1948, for "Poultry Defeathering Method," now Patent No. 2,523,302, issued on September 26, 1950.

Another object is to provide a defeathering apparatus for automatically removing all wing, body, and pin feathers including even the finest of down and hair in a single operation without entailing supplemental plucking operations, such thorough plucking additionally being accomplished without injury to the poultry.

A further object is to provide a defeathering apparatus which cleanses the poultry as an incident to the defeathering thereof.

Still another object is the provision of a defeathering apparatus which enables complete and automatic defeathering of poultry even in regions thereof which have been heretofore relatively inaccessible with known apparatuses and methods.

Still another object is the provision of a novel means for separating feathers from the means which plucks the same from the poultry.

Briefly outlined, the present invention (insofar as the apparatus is concerned) includes means for propelling rubber or rubber-like pellets against a fowl in sufficient numbers that during the defeathering operation every portion of the fowl is impinged by said pellets, such impingement effecting a knocking and drawing out of the feathers and hair from the fowl.

In order to preserve the "bloom" of the skin of the fowl to thereby enhance the salability thereof and to exclude germs and preclude bruising or other injury to the fowl whereby the same may be safely placed in cold storage without discoloring, said pellets are so formed or are of such material as to be resilient, soft rubber or rubber-like material being preferred.

Said apparatus further includes a perforated wall through which the feathers are adapted to be knocked exteriorly of the apparatus by the pellets, said pellets being retained in the apparatus and re-circulated by said propelling means. As a further feature of the apparatus, means are provided for spraying the pellets with water or the like to thereby lubricate and wash the same, said wet pellets and water particles when propelled against the fowl being further operative to thoroughly cleanse the skin of the fowl. Thus, the fowl upon being removed from the apparatus will be in a thoroughly defeathered and clean condition ready for the usual subsequent operations involving the cleaning of the interior of the fowl, etc. preparatory to sale or cold storage thereof.

It necessarily follows from the foregoing general description of the machine that the present method involves broadly the removal of feathers and cleaning by the bombardment of the fowl with resilient pellets and more particularly the bombardment of the fowl with wet pellets and water particles for further increasing the skin cleansing efficiency. From another aspect, the present invention also contemplates the novel method of separating feathers from the pellets which involves the knocking of the feathers by said pellets through a screen of mesh small enough to retain the pellets within the apparatus.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed:

In said annexed drawings:

Fig. 1 is a front elevation view of one embodiment of the present invention, a portion of the front wall being cut away to more clearly illustrate the internal construction;

Fig. 2 is a cross section view taken substantially along the line 2—2, Fig. 1;

Figure 3:
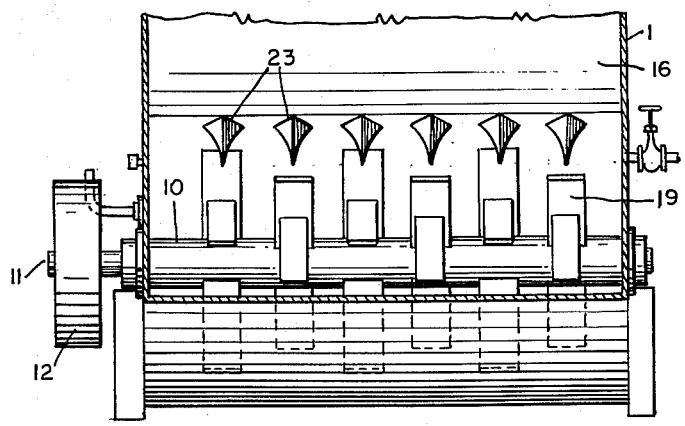
Fig. 3 is a cross section view taken substantially along the line 3—3, Fig. 2.

Referring now to the drawings and first more especially to Figs. 1 and 2 thereof, the embodiment of the machine illustrated includes a cabinet 1 having a screened front wall 2 formed as by uniformly spaced vertically disposed parallel bars 3, said bars being spaced sufficiently close together that any of the pellets 4–9, for example (see Figs. 4–9 respectively) impelled thereagainst by means to be presently described will be retained within said cabinet. However, said bars 2 are spaced apart a sufficient distance so that feathers which are removed from a bird disposed in said cabinet will be knocked by said pellets to the exterior of the cabinet and collected, if desired, in any suitable container (not shown).

Journalled in said cabinet is an impeller 10 comprising a shaft 11 projected through said cabinet and having keyed or otherwise secured at one end thereof a pulley 12 adapted to be driven in the direction indicated by the arrow 14 by any convenient power means (not shown). Included in said cabinet 1 is a partition 15 which defines with the rear wall 13 a passage 16 leading upward from the impeller 10 and curved forwardly so as to face toward the screened front wall 2. The lower portion of said partition 15 partially encircles impeller 10 and forms with the downwardly and rearwardly sloping wall portion 17 of said cabinet a trough 18 into which, as will presently appear, pellets are adapted to be collected for circulation through the passage 16 and thus toward wall 2 by impeller 10.

Figure 10:
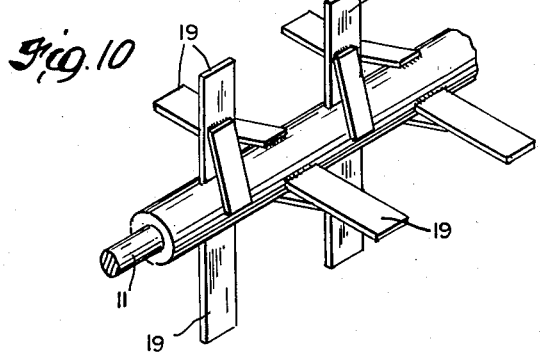
Fig. 10 is a perspective view of a portion of a preferred form of impeller rotatably mounted in the lower portion of the apparatus.

Projecting radially from shaft 11 are a series of pairs of axially spaced and diametrically opposed vanes 19 lying in planes passing through the axis of said shaft, alternate pairs of said vanes being disposed 90° apart, as best illustrated in Fig. 10, so as to balance the impeller and to uniformly distribute loads thereon.

Through the lower portion of that side of trough 18 which is defined by partition 15 are a series of openings 20 through which pellets are adapted to gravitate for being impelled by impeller 10 through passage 16. In front of openings 20 and longitudinally shiftable in said trough 18 is a gate 21 having spaced tooth-like portions 22 thereon adapted to selectively cover and uncover such openings. Thus, with trough 18 filled with pellets it is possible to start the impeller 10 under sub-desired running speed, gate 21 may be shifted to a position permitting pellets to drop through openings 20 for propulsion by said impeller. It is usually desirable to locate the openings 20 so as not to be in register with the vanes 19 in which case the pellets will first enter between successive vanes and then shift or deflect axially into the path of the vanes. At the lower edge of passage 16 there are provided a series of spreader blocks 23 which are operative, as evident from the drawing, to minimize chewing up and damaging of any pellets which may be disposed at the tips of the vanes 19.

When the pellets are made of soft rubber or rubber-like material, lubrication thereof is desirable in order to preclude sticking thereof in said trough 18 and for this purpose a water spray pipe 24 controlled as by a valve 43 is mounted longitudinally of said cabinet 1 above trough 18 but preferably below the terminus of passage 16, said pipe including a plurality of openings therethrough through which water or like liquid is adapted to be sprayed onto the pellets therebelow, such water spray in addition to lubricating the pellets, functioning to clean the pellets by flushing foreign matter therefrom. Such wetted pellets together with water particles issuing from the upper end of passage 16 in impinging upon a fowl interposed between screened wall 2 and the opposed end of passage 16 will operate not only to remove feathers from the fowl but to thoroughly cleanse or wash the exposed skin thereof. It is apparent that the volume of water may be substantially increased to further accentuate such cleansing or washing action, in which case it can be said that the pellets are entrained in a fluid stream and carried thereby for impingement or collision with the fowl disposed in the path of the pellets. It is further evident that in lieu of impeller 10, fluid under pressure including either liquids or gases may be employed for propelling the pellets toward the fowl to be de-feathered.

Figures 11, 12:
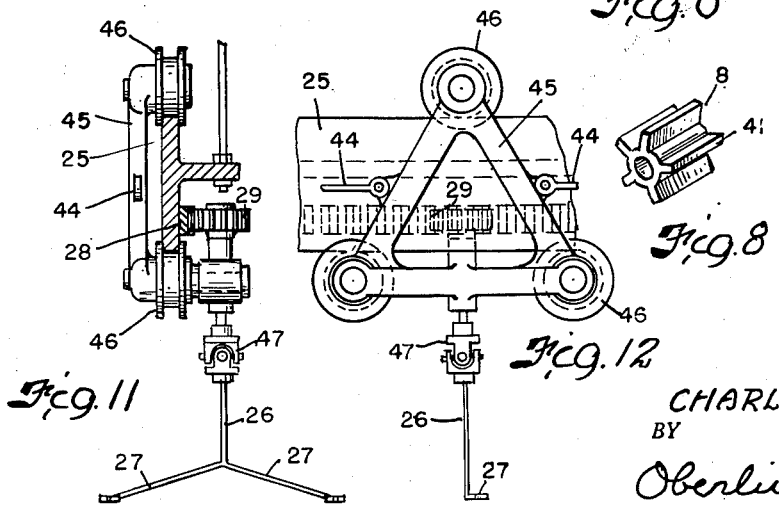
Figs. 11 and 12 are respectively side and front elevation views of a conveyor for carrying a fowl attached thereto through the apparatus and for rotating the fowl while in the apparatus.

Referring now to other features of this invention, there is provided along the upper portion of said cabinet 1 a conveyor rail 25 of any desired construction, carrying a plurality of spaced holders to the rotatable parts 26 of which the legs of the fowl may be tied, said holders being adapted to be moved along said conveyor rail through cabinet 1 as by cables 44 interconnecting successive holders to thus subject the fowl suspended therefrom to impingement by the pellets issuing from passage 16. Said holder parts 26, as best shown in Figs. 11 and 12, include a pair of arms 27 arranged to spread apart the legs of the fowl a convenient distance, for example about eight inches, so as to provide access of the pellets to regions of the fowl between the legs.

Each holder includes a body 45 with freely rotatable grooved rollers 46 thereon engaging the upper and lower edges of rail 25 whereby said holder comprising body 45 and holder part 26 rotatably supported by said body may be drawn through the machine as by the cables 44 which interconnect successive holders. Said conveyor rail 25 and holder parts 26 are further provided with interengaging parts 28 and 29, herein a rack and gear respectively, whereby the holders, and thus the fowl suspended therefrom, will be rotated about a vertical axis during the passage of the holders with the fowl thereon through said cabinet 1.

Furthermore, said rail 25 is preferably inclined as illustrated whereby every portion of the fowl during its transportation through said cabinet 1 will be impinged by the pellets even though the vertical height of the fowl is greater than the vertical width of passage 16. In order that each holder part 26 will hang in a vertical position during movement along the inclined section of rail 25, a universal joint 47 is associated therewith.

For supporting the fowl in a substantially vertical position during its passage through said cabinet 1 against the impact of the pellets thereagainst, parallel guide rails 30 are mounted in said cabinet at the level of the fowl so as to be engaged thereby.

To facilitate defeathering of the fowl around the vent thereof, under the wings, and other difficultly accessible regions, cabinet 1 is provided with a shelf 31 therein on which the bird is supported on its back or stomach and rotated to thus bring such regions in a direct line with passage 16 and the pellets issuing therefrom. To permit such supporting of the fowl on said shelf, guide rails 30 are curved forwardly and downwardly of cabinet 1, as clearly illustrated in Figs. 1 and 2.

As a further feature of this invention, a swinging door 32 is provided at each end of cabinet 1, and inwardly adjacent each door 32 is a rubber or fabric wall 33 including a vertical slit 34 therethrough through which doors and slits the fowl is adapted to be drawn, such walls and doors being operative to preclude loss of pellets glancing off the fowl or struck by other pellets so as to move in a direction toward such slits and doors. Any pellets which pass between the slits 34 will strike against said doors 32, drop downward, and be directed by the sloping walls 35 of cabinet 1 into trough 18.

With reference to the pellets, the same may be of a variety of different forms as exemplarily illustrated in Figs. 4–9. As previously indicated, said pellets are preferably made of rubber or rubber-like material the hardness of which can be varied over a wide range correlatively with the velocity thereof. For example, satisfactory results have been obtained with pellets of a hardness of 35 durometer propelled by an impeller 10 having a vane tip velocity of about 4,000 feet per minute, the velocity of the pellets at the time of impingement thereof with the fowl therefore being somewhat less due to engagement of the pellets with one another and with the walls of passage 16, and deceleration of the pellets caused by ascension thereof through passage 16. Obviously, softer pellets of 20–25 durometer, for example, may be propelled at a correspondingly greater velocity without injuring the fowl, and, conversely, pellets harder than 35 durometer should be propelled at a correspondingly reduced velocity.

Figures 4, 5:
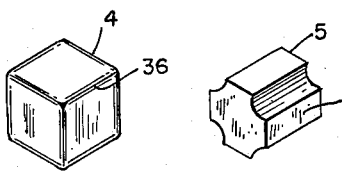
Figs. 4–9 are perspective views of various forms of pellets which may be employed.

The pellet 4 illustrated in Fig. 4 is cubical in form preferably provided with rounded edges and corners 36. A pellet so shaped provides corners which are ideally adapted to enter indentations in the fowl for thus effectively knocking and drawing out feathers and hair which may be disposed in such indentations. Pellets 4 of the order of 5/8 to 3/4" in size have produced excellent results.

The pellet 5 illustrated in Fig. 5 is provided with a plurality of lugs 37 providing a number of external corners and edges adapted to enter indentations in the fowl as indicated above.

Figures 6, 7:
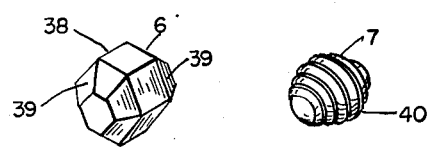

The pellet 6 illustrated in Fig. 6 is of a polygonal cross section at its intermediate section 38 and is formed with frusto-pyramidal end portions 39 of corresponding cross section.

The pellet 7 illustrated in Fig. 7 comprises a sphere formed with serrations 40 thereabout, such serrations being operative to improve the feather removing efficiency as compared with an unserrated sphere.

Figures 8, 9:

The pellet 8 illustrated in Fig. 8 is of a tubular form provided with axially extending lugs 41 projecting radially therefrom. In this case the tubular form of the pellet renders the same more readily deformable and therefore may be made of a somewhat harder material but yet propelled at a velocity corresponding with a softer but solid pellet.

The pellet 9 illustrated in Fig. 9 comprises a sphere provided with a plurality of lugs 42 projecting radially therefrom such lugs, of course, being adapted to enter in various indentations in the fowl.

Any of the pellets 4–9 illustrated may obviously be of a hollow form to provide an air cushion therein or of a tubular or other readily deformable or resilient form.

The operation of the machine will now be described. First, of course, pellets are loaded into trough 18, it having been found that some 1,300 pellets per foot of length of impeller 10 is adequate.

The number of pellets used is not, of course, critical except from the standpoint of productive capacity of the machine, it being understandable that even a single pellet is sufficient if propelled at the fowl hundreds or thousands of times. With 1,300 pellets per foot propelled at the rate indicated, virtually a storm is created enabling cleaning and defeathering of some 500 fowl per hour for a machine of six-foot width with one attendant taking care of one or more machines.

At this stage, with pellets in trough 18, gate 21 is in a position covering openings 20 leading into the impeller casing whereupon said impeller may be started under no load. After having started said impeller, gate 21 may be shifted to uncover openings 20 and the water in pipe 24 turned on by manipulation of valve 43. Within a few seconds, a continuous stream of pellets issues from passage 16 and in striking wall 2 and bouncing therefrom collide with one another thereby creating a dense storm of pellets rapidly moving within cabinet 1. With the machine so operating, poultry previously subjected to a one minute "slack" scald in water at 123–128° F. may be transported through said cabinet while simultaneously rotated to thereby subject the poultry to impingement by said pellets, such impingement effecting a complete defeathering and cleansing of the poultry as previously indicated. As the feathers drop, the pellets missing or glancing from the poultry strike such feathers and knock them through the spaces between bars 3 to the exterior of said cabinet. The spent pellets then drop into trough 18 wherein they are wetted, washed, and lubricated prior to being again circulated by impeller 10.

Figure 13:
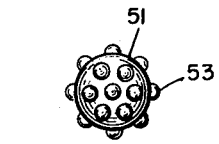
Figs. 13 and 14 are elevation views of two other types of pellets.
Figure 14:
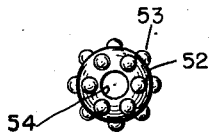

The forms of pellets 51 and 52 illustrated in Figs. 13 and 14 have proved to be particularly efficient, said pellets being of spherical form of about 1 1/8" diameter and provided with hemispherical nubs 53 thereon adapted to enter the indentations in the fowl, said nubs being about 1/4" in diameter. To impart added resilience and greater ease of deformation the pellet 52 has a 1/2" diameter hole 54 through the center.

Figure 15:
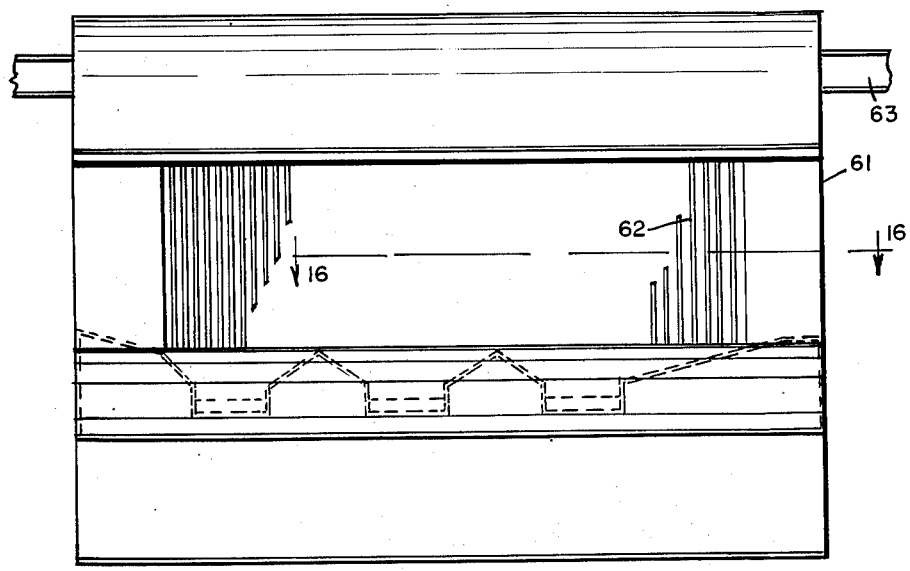
Fig. 15 is a front elevation view of a modified form of apparatus.
Figure 16:
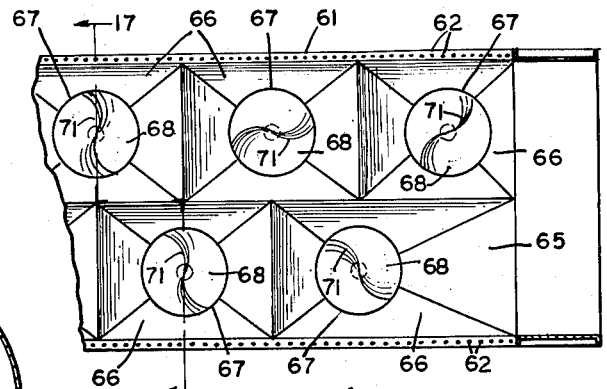
Fig. 16 is a fragmentary cross-section view taken substantially along the line 16—16, Fig. 15.
Figure 17:
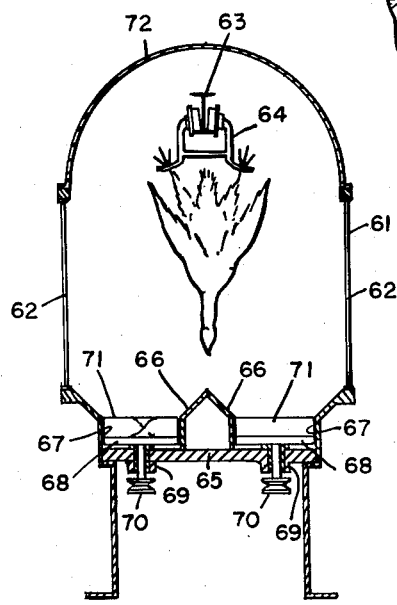
Fig. 17 is a vertical cross-section view taken substantially along the line 17—17, Fig. 16.

The modified form of apparatus illustrated in Figs. 15–17 comprises a cabinet 61 having screened walls 62 along its opposite sides. Extending through the upper portion of said cabinet is a conveyor rail 63 movably mounting a series of fowl carriage units 64 thereon for passage through the cabinet from one end to the other. As best shown in Fig. 17, said carriages 64 are each adapted to be attached to the legs of the fowl to suspend the fowl in a generally vertical position.

Below the conveyor and the fowl attached to the carriages 64 is a plate unit 65 formed with two rows of pyramidal depressions 66 in staggered relation, each depression having an opening 67 through the apex. Mounted in each depression and extending across such opening is an impeller 68 journalled in a bearing 69 and having a drive pulley 70 affixed thereto. Each impeller has one or more upstanding vanes 71 on its upper surface adapted, upon rotation of the impeller to direct the pellets 4 to 9, 51, or 52 upwardly against the birds being carried through the cabinet 61. The inclined faces of the depressions 66 will, of course, serve to continually convey pellets downwardly to the impellers 68.

The pulleys 70 will have trained thereover a suitable belt driven as by an electric motor (not shown).

To operate the apparatus of Figs. 15–17 the cabinet is loaded with a large number of pellets and as the impellers 68 reach normal running speed the pellets will be shot upwardly at the birds carried through the cabinet 61, some pellets striking the birds directly, others striking the screened walls 62 and curved top wall 72 of the cabinet and bouncing from such walls against the birds and other pellets. Finally, the pellets first shot upward will have spent their energy and will gravitate down to the impellers 68 for re-circulation. The feathers which are removed from the birds will be knocked through the screened walls 62.

Here again as in the form of apparatus illustrated in Fig. 1 the end walls of the cabinet 61 may be provided with slit fabric end walls or the like and/or swinging doors to prevent loss of pellets.

Other modes of applying the principle of the invention may be employed, change being made as regards the details described, provided the features stated in any of the following claims, or the equivalent of such, be employed.

I, therefore, particularly point out and distinctly claim as my invention:

1. A poultry defeathering machine comprising a cabinet formed with a generally cylindrical impeller housing including a passage leading tangentially therefrom, means for supporting poultry in said cabinet opposite such passage, an impeller within said impeller housing adapted when rotated therein to direct resilient pellets through such passage against the poultry, said impeller comprising a shaft coaxial with such impeller housing provided with vanes projecting radially therefrom, and spreader blocks forming a portion of the wall of such impeller housing adjacent such passage and opposite the vanes of said impeller, said spreader blocks being of V-shaped cross-section in a plane containing the axis of said shaft.

2. Apparatus for defeathering poultry by subjecting the poultry to impingement by moving resilient pellets comprising a cabinet surrounding the poultry and containing a substantial number of resilient pellets, an impeller in said cabinet operative to propel the pellets toward the poultry, and means to return the spent pellets to said impeller for re-circulation, said cabinet being provided with a screened side wall through which the feathers from the poultry are adapted to be knocked by pellets which glance off the poultry and cabinet walls and which miss the poultry.

3. A poultry defeathering machine comprising a cabinet provided with a screened wall, an impeller means for propelling resilient pellets toward such screened wall, said impeller means having a pellet discharge passage leading into said cabinet and terminating in an opening which faces and is spaced from such screened wall a distance to accommodate poultry for impingement by the pellets, and means associated with said cabinet for suspending poultry in the space between such screened wall and such passage in the path of the pellets whereby pellets impinging upon the poultry are effective to remove feathers therefrom, such screened wall having a mesh of size such that only feathers are knocked therethrough by pellets which glance off the poultry and which miss the poultry, and the pellets thus impelled toward the poultry and such screened wall being of a size too large to pass through the latter whereby the pellets are retained within said cabinet for re-use.

4. A poultry defeathering machine comprising a cabinet, means associated with said cabinet for supporting poultry in the upper portion of said cabinet, an impeller means associated with said cabinet for propelling resilient deformable pellets, said impeller means having a pellet discharge passage leading into said cabinet and terminating in an opening which faces the poultry thus supported, whereby the pellets are propelled against the poultry to remove feathers therefrom, a trough in the lower portion of said cabinet provided with an opening through which pellets gravitate into said impeller for re-circulation, and a gate in said trough shiftable to positions covering and uncovering such opening in said trough.

5. A poultry defeathering machine comprising a cabinet, means associated with said cabinet for supporting poultry in the upper portion of said cabinet, an impeller means for propelling resilient deformable pellets, said impeller means having a pellet discharge passage leading into said cabinet and terminating in an opening which faces the poultry thus supported whereby the pellets are propelled against the poultry to remove feathers therefrom, a trough in the lower portion of said cabinet provided with an opening through which pellets gravitate into said impeller for re-circulation, said impeller comprising a rotary shaft provided with axially spaced and uniformly staggered vanes projecting radially therefrom, and a generally cylindrical housing for said shaft and vanes into which such opening in said trough leads and from which such pellet discharge passage leads.

6. A poultry defeathering machine comprising a cabinet, means associated with said cabinet for supporting poultry therein, an impeller means for propelling resilient pellets against poultry thus supported, said impeller means having a pellet discharge passage leading into said cabinet, and a shelf in said cabinet supporting the poultry with its vent and neck in a line generally parallel to the path of the pellets discharged from such passage.

7. A poultry defeathering machine comprising a cabinet, means associated with said cabinet for suspending poultry by its legs in depending relation from said means, an impeller means for propelling resilient pellets against the poultry thus suspended, said impeller means having a generally horizontally disposed pellet discharge passage leading into said cabinet and terminating in an opening which faces one side of the poultry thus suspended, and guide means in said cabinet disposed against the opposite side of the poultry for supporting the poultry against the impact of the pellets.

8. Apparatus for defeathering poultry by subjecting the poultry to impingement by moving resilient pellets comprising a cabinet containing a substantial number of resilient pellets, means associated with said cabinet for supporting poultry in the upper portion of said cabinet, an impeller in the lower portion of said cabinet operative to propel said resilient pellets against the poultry thus supported, and means in said cabinet to return the spent pellets to said impeller for recirculation, said means comprising cabinet walls in the lower portion of said cabinet which slope toward and lead to said impeller.

9. The apparatus of claim 8 characterized further in that said cabinet is formed with an opening at the bottom to which said walls slope, and that said impeller extends into such opening and has an upstanding vane adapted to propel upwardly said pellets gravitating thereto.

CHARLES F. HUNT.

References Cited in the file of this patent

UNITED STATES PATENTS

| Number | Name | Date |
| --- | --- | --- |
| 1,934,494 | Gillespie | Nov. 7, 1933 |
| 2,344,476 | Turnbull | Mar. 14, 1944 |
| 2,423,560 | Jasper | July 8, 1947 |
| 2,510,927 | Huyett | June 6, 1950 |
| 2,523,302 | Hunt | Sept. 26, 1950 |